UNITED STATES PATENT OFFICE.

BERNHARD GRAU, OF KRATZWIECK, NEAR STETTIN, GERMANY.

PRODUCTION OF CEMENT.

No. 813,965.

Specification of Letters Patent.

Patented Feb. 27, 1906.

Application filed June 21, 1904. Serial No. 213,541.

*To all whom it may concern:*

Be it known that I, BERNHARD GRAU, a subject of the German Emperor, and a resident of Kratzwieck, near Stettin, Germany, have invented an Improvement in the Production of Cement, of which the following is a specification.

My invention consists of an improved, simple, and efficient method of producing hydraulic cement from blast-furnace slag.

In carrying out my invention I treat the hot slag as it comes from the blast-furnace, so that I avail myself of the heat of the hot mass in the production of the cement and so avoid having to independently heat the slag specially for the purpose. The jet of fluid slag as it runs from the blast-furnace is treated with steam by blowing a jet of steam against the jet of slag—say at right angles to it. This may be done either in a closed chamber or in an open space. Dry superheated steam is most suitable for the purpose. I find it to be suitable and effective to so regulate the force of the jet of steam in proportion to the strength of the jet of slag that the latter is changed by the steam into clinkers of a granulated character. Through this treatment with steam the fluid slag undergoes chemical and physical changes and takes on other qualities of such a kind that the clinker produced by the steam when ground to the fineness of powder produces a cement powder which when treated with water shows the same hardening capabilities which are found in the ordinary Portland cement of commerce.

By my process of forcing a jet of dry superheated steam against a stream of molten slag and allowing the thus-treated slag to fall in a heap and to cool itself without artificial means I am enabled to avail myself of the heat of the hot mass in the production of the cement, and I finally form in this way a porous mass which when pulverized yields directly a cement which has the properties of a good Portland cement.

The cement produced thus, poor in lime, may be placed on the market either alone or ground up with other cements or cement clinkers which are richer in lime.

I claim as my invention—

As an improvement in the mode of producing cement from molten slag, the method herein described of blowing a sufficiently strong and violent jet of superheated steam against a jet of the molten blast-furnace slag that the thus-divided slag is driven off by the steam-jet so as to form a heap of slag and in allowing this mass to cool in itself without artificial means, thereby enabling the heat of the slag to act on the mass during its cooling, and then grinding this mass to powder, as and for the purpose described.

In testimony whereof I have signed my name to this specification in the presence of two subscribing witnesses.

BERNHARD GRAU

Witnesses:
ARTHUR BRANDT,
HANS HILDEBRAND.